US012154537B2

(12) United States Patent
Hsieh et al.

(10) Patent No.: US 12,154,537 B2
(45) Date of Patent: Nov. 26, 2024

(54) HOWLING SUPPRESSION FOR ACTIVE NOISE CANCELLATION (ANC) SYSTEMS AND METHODS

(71) Applicant: Synaptics Incorporated, San Jose, CA (US)

(72) Inventors: Pei-Wen Hsieh, New Taipei (TW); Chuan-Yau Chan, New Taipei (TW); Saeed Mosayyebpour Kaskari, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 245 days.

(21) Appl. No.: 18/058,508

(22) Filed: Nov. 23, 2022

(65) Prior Publication Data

US 2024/0169969 A1 May 23, 2024

(51) Int. Cl.
*G10K 11/178* (2006.01)

(52) U.S. Cl.
CPC .. *G10K 11/17825* (2018.01); *G10K 11/17823* (2018.01); *G10K 11/17881* (2018.01); *G10K 2210/3026* (2013.01); *G10K 2210/3027* (2013.01); *G10K 2210/3028* (2013.01); *G10K 2210/3038* (2013.01); *G10K 2210/3044* (2013.01); *G10K 2210/3056* (2013.01)

(58) Field of Classification Search
CPC ....... G10K 11/17825; G10K 11/17823; G10K 11/17881; G10K 2210/3026; G10K 2210/3027; G10K 2210/3028; G10K 2210/3038; G10K 2210/3044; G10K 2210/3056; G10K 11/17854; G10K 2210/1081; G10K 11/178; G10K 11/17817; G10K 11/17879
USPC ............................... 381/71.1–71.14; 181/206
See application file for complete search history.

(56) References Cited

U.S. PATENT DOCUMENTS 5,517,571 A * 5/1996 Saruta .............. G10K 11/17817 381/71.5
7,574,005 B2 * 8/2009 Tohyama ................ H03G 3/32 381/98

(Continued)

OTHER PUBLICATIONS

Van Waterschoot, Toon, "Fifty Years of Acoustic Feedback Control: State of the Art and Future Challenges," Proceedings of the IEEE, vol. 99, No. 2, Feb. 2011, pp. 288-327.

*Primary Examiner* — Xu Mei
(74) *Attorney, Agent, or Firm* — Paradice & Li LLP

(57) ABSTRACT

An audio processing system, such as an active noise cancellation system, and method suppresses tonal howling in a feedback system based on a gain enhancement system that emphasizes the howling signal and deemphasizes non-howling signals. The howling signal is extracted from an error signal generated from sound from a speaker sensed by an error sensor. The gain enhancement signal is generated based on a first power ratio between a filtered reference signal, generated based on sound sensed from external noise by a reference sensor, and a filtered error signal and/or a second power ratio between two filtered error signals with different passbands. Using the gain enhancement signal and the howling signal, a howling suppression gain signal is generated and used to amplify the error signal. A feedback signal produced based on the amplified error signal is provided to the speaker as an anti-noise signal with suppressed howling.

23 Claims, 6 Drawing Sheets

(56) References Cited

U.S. PATENT DOCUMENTS

| | | | | |
|---|---|---|---|---|
| 7,697,696 | B2 * | 4/2010 | Okumura | H04R 3/02<br>381/71.11 |
| 10,714,073 | B1 | 7/2020 | Rui et al. | |
| 11,030,989 | B2 | 6/2021 | Thormundsson et al. | |
| 11,057,702 | B1 * | 7/2021 | Edry | H04R 3/02 |
| 11,277,518 | B2 | 3/2022 | Li et al. | |
| 2005/0286714 | A1 * | 12/2005 | Tokuda | H04B 3/23<br>379/406.05 |
| 2007/0121928 | A1 * | 5/2007 | Beaucoup | H04M 9/082<br>379/406.08 |
| 2020/0186923 | A1 * | 6/2020 | Chen | H04R 3/005 |

* cited by examiner

HOWLING SUPPRESSION FOR ACTIVE NOISE CANCELLATION (ANC) SYSTEMS AND METHODS

TECHNICAL FIELD

The present application relates generally to noise cancelling systems and methods, and more specifically, for example, to adaptive cancelling and/or suppression of tonal howling signals in headphones (e.g., circum-aural, supra-aural and in-ear types), earbuds, hearing aids, and other personal listening devices.

BACKGROUND OF RELATED ART

Active noise cancellation (ANC) systems commonly operate by sensing ambient noise through a reference microphone and generating a corresponding anti-noise signal that is approximately equal in magnitude, but opposite in phase, to the sensed ambient noise. The ambient noise and the anti-noise signal cancel each other acoustically, allowing the user to hear only a desired audio signal. To achieve this effect, a low-latency, programmable filter path from the reference microphone to a loud-speaker that outputs the anti-noise signal may be implemented.

Feedback ANC topology is commonly used in ANC systems because it can provide a stable amount of noise cancellation without being affected by external disturbances, such as wind noises. Feedback ANC topology contains an error microphone, a loudspeaker and a feedback filter. The error microphone is located inside the ear cup of the headphone or inside the wearer's ear canal with earbuds and receives external environment noises that the wearer hears. The feedback filter processes the error microphone signals to generate anti-noise signals, and the loudspeaker plays the anti-noise signals to cancel out environment noises. The feedback system in the feedback ANC topology, however, has a risk of runaway amplification, in which the system receives its own anti-noise signal and increases the level of amplification in an attempt to cancel it out. Thus, the feedback system may become unstable and create tonal howling signals, resulting in a ringing feedback sound, which has negative impacts on user experience.

In view of the foregoing, there is a continued need for improved active noise cancellation systems and methods for headphones, earbuds and other personal listening devices.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An audio processing system, such as an active noise cancellation system, and a method for suppressing tonal howling in a feedback system based on a gain enhancement system that emphasizes the howling signal and deemphasizes non-howling signals. The howling signal is extracted with a linear filter based on an error signal generated from sound from a speaker sensed by an error sensor. The gain enhancement signal may be generated based on at least one of a first power ratio between a filtered reference signal, the filtered reference signal generated from sound sensed from external noise by a reference sensor, and a filtered error signal and a second power ratio between two filtered error signals with different passbands. Based on the gain enhancement signal and the howling signal, a howling suppression gain signal is generated, which is used to produce an amplified error signal. The amplified error signal is used to generate a feedback signal with a feedback filter, which is provided to the speaker as an anti-noise signal with suppressed howling.

In one aspect, an audio processing system includes a speaker; a reference sensor configured to generate a reference signal from external noise; an error sensor configured to generate an error signal from sound sensed from the speaker; at least one memory; and a processing system comprising one or more processors coupled to the at least one memory. The processing system is configured to extract, with a linear filter, a howling signal based on the error signal; generate a gain enhancement signal that emphasizes the howling signal and deemphasizes non-howling signals in the error signal based on at least one of a first power ratio between a filtered reference signal and a filtered error signal and a second power ratio between two filtered error signals with different passbands; generate a howling suppression gain signal based on the gain enhancement signal and the howling signal; produce an amplified error signal based on the howling suppression gain signal; and generate, with a feedback filter, a feedback signal based on the amplified error signal, the feedback signal is provided to the speaker.

In one aspect, a method for audio processing for howling suppression includes extracting, with a linear filter, a howling signal based on an error signal generated from sound sensed from a speaker by an error sensor; generating a gain enhancement signal that emphasizes the howling signal and deemphasizes non-howling signals in the error signal based on at least one of a first power ratio between a filtered reference signal, the filtered reference signal generated from sound sensed from external noise by a reference sensor, and a filtered error signal and a second power ratio between two filtered error signals with different passbands; generating a howling suppression gain signal based on the gain enhancement signal and the howling signal; and producing an amplified error signal based on the howling suppression gain signal; and generating, with a feedback filter, a feedback signal based on the amplified error signal, the feedback signal is provided to the speaker.

In one aspect, an audio processing system includes a speaker; a reference sensor configured to generate a reference signal from external noise; an error sensor configured to generate an error signal from sound sensed from the speaker; a feedback filter that provides a feedback signal to the speaker based on an amplified error signal; and a howling suppression system. The howling suppression system includes a linear filter configured to extract a howling signal based on the error signal; a howling signal enhancement subsystem configured to generate a gain enhancement signal that emphasizes the howling signal and deemphasizes non-howling signals in the error signal based on at least one of a first power ratio between a filtered reference signal and a filtered error signal and a second power ratio between two filtered error signals with different passbands; a gain control subsystem configured generate a howling suppression gain signal based on the gain enhancement signal and the howling signal; and an amplifier configured to receive the error signal and to produce the amplified error signal based on the howling suppression gain signal.

BRIEF DESCRIPTION OF THE DRAWINGS

The present implementations are illustrated by way of example and are not intended to be limited by the figures of the accompanying drawings.

DETAILED DESCRIPTION

Figure 1:
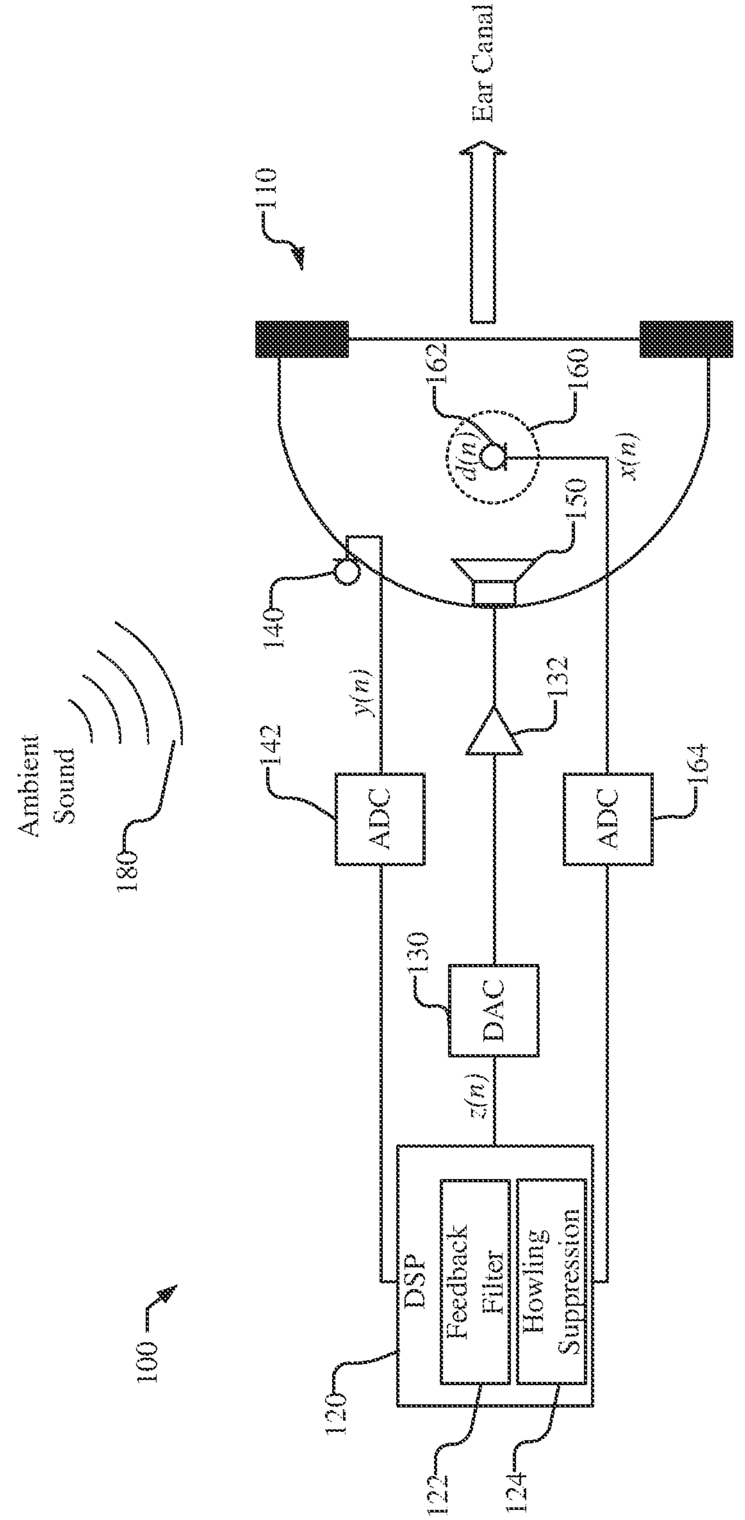
FIG. 1 shows an example audio processing system, such as an active noise cancelling system.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "generating," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the described functions or methods. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

The term "audio processing system" or "ANC system" as used herein, may refer to any device capable of performing noise cancellation including feedback ANC. Examples of audio processing systems may include, but are not limited to, headphones (e.g., circum-aural, supra-aural and in-ear types), earbuds, hearing aids, and other types of personal listening devices.

A headphone or other personal listening device may include an ANC system to attenuate ambient noise. In a general arrangement, an ANC system includes a reference sensor (e.g., a microphone or other audio sensor) and a filter. The reference sensor senses the ambient noise and generates a corresponding reference audio signal. The adaptive filter generates an anti-noise signal from the reference audio signal and passes it to a loudspeaker or other transducer to offset the ambient sound at the listener's ear. The anti-noise signal is ideally 180 degrees out of phase with the ambient noise signal thereby cancelling the ambient noise at the listener's ear.

A feedback ANC topology is commonly used in ANC systems as it provides stable amounts of noise cancellation without being affected by external disturbances such as wind noises. Feedback ANC topology contains a least one error sensor, (e.g., a microphone or other audio sensor), one loudspeaker and one feedback filter. The error sensor receives external environment noises, the feedback filter processes the error sensor signals to generate the anti-noise signals, and the loudspeaker plays the anti-noise signals to cancel out the environment noises. The feedback filter is typically static and designed according to a static secondary path, which is the loudspeaker-to-error-sensor acoustic feedback path. If secondary path is dynamic, however, the feedback system might be unstable, e.g., if the secondary path is dynamic, and create tonal howling signals, which have negative impacts on user experience.

One method that may be used to try to control howling in a feedback system is gain reduction. Gain reduction methods use howling detectors on the error sensor, and if howling is detected the loop gain is decreased to stabilize the feedback loop. Conventional howling detectors typically are implemented by monitoring tonal spectral properties, e.g., spectral peakedness, of error sensor signal. Conventional howling detectors, however, are not suitable for ANC applications because the howling detectors may fail to distinguish between the true howling signals and environmental noises, which have similar spectral properties. If conventional howling detectors produce false alarms triggered by environmental tonal noises, then the feedback loop gain will be reduced resulting in the anti-noise signal being attenuated such that noise cancelling performance of ANC systems will be degraded.

Other methods that may be used to try to control howling in a feedback system is adaptive-filter-based methods, which do not require howling detectors. Adaptive-filter-based methods treat howling signals as an echo and cancel it out using adaptive filters. Adaptive-filter-based methods require decorrelation between the error sensor signals and the loudspeaker signals. However, decorrelation introduces latency, and the latency adds to anti-noise signals such that the noise cancelling performance will be degraded due to more phase mismatch between anti-noise signals and environment noise signals.

Aspects of the present disclosure recognize the problems associated with feedback ANC, such as the presence of howling, and limitations of gain reduction methods and adaptive-filter-based methods to control howling in a feedback ANC system. Various aspects discussed herein relate generally to the suppression of howling in an audio processing system that includes a speaker, reference sensor that generates reference signals from external noises, an error sensor that generates error signals from sound sensed from the speaker, and a feedback filter that provides a feedback signal to the speaker based on an amplified error signal. The audio processing system further includes a howling suppression system. The howling suppression system includes a linear filter that generates a howling signal based on the error signal and a howling signal enhancement subsystem that generates a gain enhancement signal. The howling signal enhancement subsystem, for example, may be a single layer or multi-layer neural network. The gain enhancement signal, for example, may be based on a log power ratio between a filtered reference signal and a filtered error signal or a log power ratio between two filtered error signals with different passbands. A gain control subsystem generates a howling suppression gain signal that is based on the gain enhancement signal and the howling signal. An amplifier receives the error signal and produces the amplified error signal based on the howling suppression gain signal.

The use of the howling suppression system is advantageous as it reduces or avoid false alarms found in gain reduction methods and does not degrade performance due to decorrelation as required in adaptive-filter-based methods.

FIG. 1 illustrates an audio processing system, sometimes referred to as active noise cancelling (ANC) system 100, in the form of an active noise cancellation headset that provides howling cancellation and/or suppression, in accordance with one or more embodiments of the present disclosure. The ANC system 100 includes an audio device, such as headphone 110, and audio processing circuitry, such as digital signal processor (DSP) 120, a digital to analog converter (DAC) 130, an amplifier 132, a reference sensor 140, a loudspeaker 150, an error sensor 162, and other components.

In operation, a listener may hear external noise d(n) through the housing and components of the headphone 110. To cancel the noise d(n), the reference sensor 140 senses the external noise (such as ambient noise 180), producing a reference signal y(n) which is fed through an analog-to-digital converter (ADC) 142 to the DSP 120. The DSP 120 generates an anti-noise signal z(n), which is fed through the DAC 130 and the amplifier 132 to the loudspeaker 150 to generate anti-noise in a noise cancellation zone 160. The DSP 120 is configured to cancel and/or suppress the noise d(n) in the noise cancellation zone 160 by generating anti-noise that is equal in magnitude and opposite in phase to the noise d(n) in the noise cancellation zone 160. The resulting mixture of noise and anti-noise is captured by the error sensor 162, along with any external noise (such as ambient noise 180) that passes through the housing of the headphone 110, and the error sensor 162 generates an error signal x(n) which is a measure of the effectiveness of the noise cancellation. The error signal x(n) is fed back through ADC 164 to the DSP 120, which adjusts the magnitude and phase of the anti-noise signal z(n) to minimize the error signal x(n) within the cancellation zone 160 (e.g., drive the error signal x(n) to zero).

In some embodiments, the loudspeaker 150 may also generate desired audio (e.g., music) which is received by the error sensor 162 and removed from the error signal x(n) during processing by the DSP 120 (or other audio components). It will be appreciated that the embodiment of FIG. 1 is one example of an active noise cancellation system and that the systems and methods disclosed herein may be implemented with other audio processing systems, such as adaptive noise cancelling implementations, that include a reference sensor and an error sensor.

The DSP 120 employs ANC processing that includes a feedback filter 122 that receives the error signal x(n) from the error sensor 162 and processes the error signal x(n) to produce the anti-noise signal z(n). The feedback filter 122, for example, may be static and designed according to a static secondary path, e.g., the acoustic feedback path between the loudspeaker 150 and the error sensor 162. The secondary path, however, may be dynamic, i.e., the acoustic feedback path between the loudspeaker 150 and the error sensor 162 may change, which will cause the feedback system to become unstable resulting in tonal howling signals that will negatively impact the listening experience.

To cancel or suppress howling signals, the DSP 120 includes a howling suppression component 124 that utilizes not only error signals from the error sensor 162 but also reference signals from the reference sensor 140 to detect and emphasize howling signals, while deemphasizing non-howling signals to suppress or eliminate tonal howling signals in the feedback system. The DSP 120 may comprise one or more of a processor, a microprocessor, a programmable logic device, a digital signal processor or other logic device. The howling suppression component 124, and other ANC components and processes, such as the feedback filter 122, discussed herein, may comprise software instructions stored in a memory for execution by the DSP 120.

Figure 2:
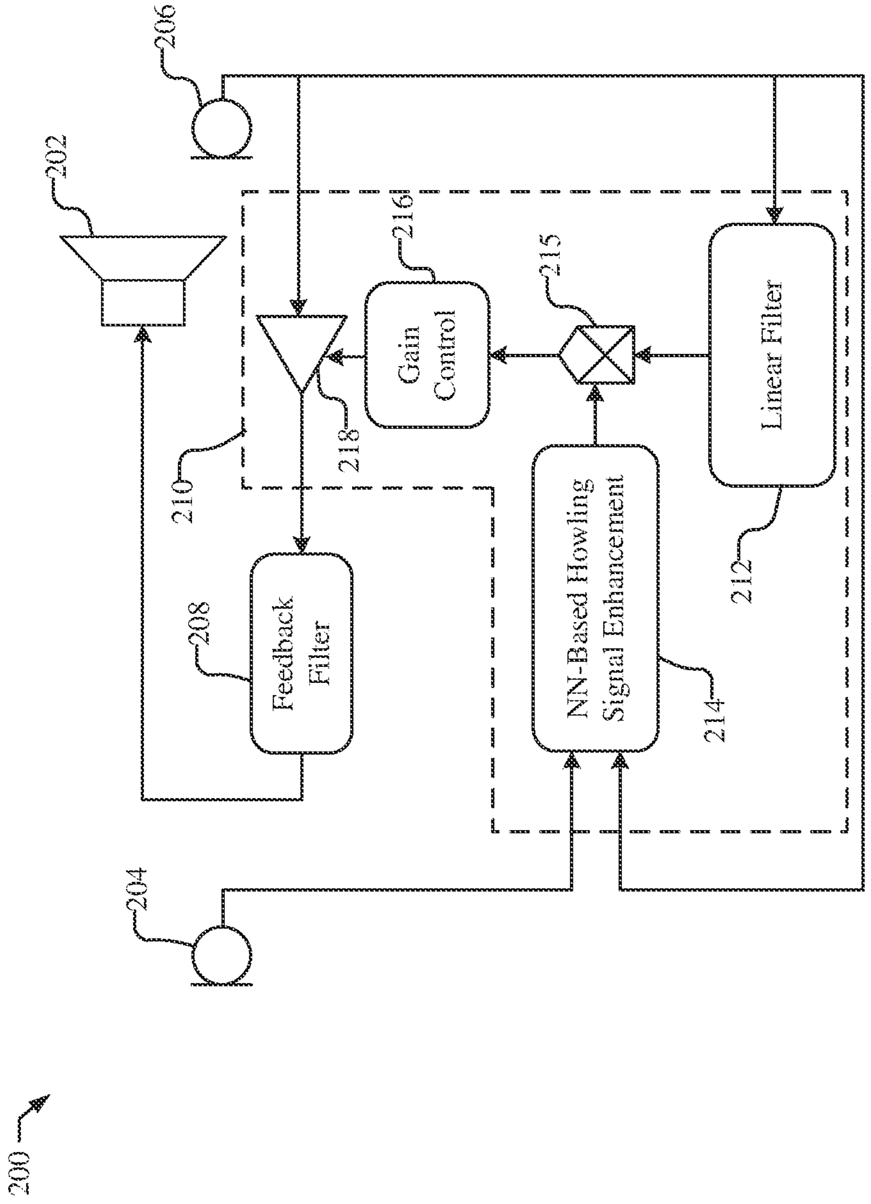
FIG. 2 shows a block diagram of an audio processing system, such as an active noise cancelling system, implementing a howling suppression system.

FIG. 2 illustrates a block diagram of the howling suppression system 210 in an audio processing system, sometimes referred to as ANC system 200, in accordance with one or more implementations. The ANC system 200, for example, may be an implementation of the ANC system 100 shown in FIG. 1, and the howling suppression system 210 may be an implementation of the howling suppression component 124 shown in FIG. 1. As illustrated in FIG. 2, the ANC system 200 includes, among other components, a speaker 202, a reference sensor 204 that receives external noise and generates a reference signal in response, an error sensor 206 that receives sound from the speaker 202 and any external noise that passes through the housing of the listening device and generates an error signal in response, a feedback filter 208 that receives an amplified error signal and provides a feedback signal to the speaker 202 in response, and the howling suppression system 210 that provides suppression or cancellation of tonal howling in the ANC system 200. The reference sensor 204 is placed at a position where it can receive external noises but is isolated from the speaker 202, so that the reference signal does not include (or includes only a small amount of) sound from the speaker 202.

The howling suppression system 210 includes a linear filter 212 that receives the error signal from the error sensor 206 and extracts a howling signal in response to the error signal. The linear filter 212, for example, may be configured to extract the howling signals from the error signal using a linear operation, such as bandpass filtering. The bandpass filtering, for example, may be configured to pass a frequency of the howling signal. For example, if the frequency of the howling signal in the ANC system 200 is 2000 Hz, then the passband of the linear filter 212 may be chosen as 1500 Hz to 2500 Hz. The linear filter 212, for example, may be implemented as an $8^{th}$-order infinite impulse response (IIR) bandpass filter.

The howling suppression system 210 further includes a howling signal enhancement subsystem 214 that is configured to receive the error signal from the error sensor 206 and the reference signal from the reference sensor 204 and generate a gain enhancement signal in response that emphasizes howling signals and deemphasizes non-howling signals. The howling signal enhancement subsystem 214 may be a neural network that can be single-layer or multi-layer. The use of a neural network for the howling signal enhancement subsystem 214 is advantageous as input features based on the error signal and reference signal may be combined easily. Because the reference sensor 204 is isolated from the speaker 202 such that the reference signal does not include sound from the speaker 202, the howling signal enhancement subsystem 214 may differentiate howling signals produced by the speaker 202 and the non-howling signals. The howling signal enhancement subsystem 214, for example, may be configured to generate the gain enhancement signal based on a power ratio, e.g., log power ratio, between a filtered reference signal from the reference sensor 204 and a filtered error signal from the error sensor 206. For example, the power ratio between the filtered reference signal and the filtered error signal may be based on an amplitude of the filtered error signal or based on a log amplitude slope deviation of the filtered error signal. In some implementations, the howling signal enhancement subsystem 214 may be further configured additionally or alternative to generate the gain enhancement signal based on a power ratio, e.g., log power ratio, between two filtered error signals from the error sensor 206 with different passbands. For example, the power ratio between the two filtered error signals may be based on amplitudes of the filtered error signals or based on log amplitude slope deviations of the filtered error signals.

The howling suppression system 210 further includes a gain control subsystem 216 that generates a howling suppression gain signal based on the gain enhancement signal and the howling signal. For example, the gain enhancement signal from the howling signal enhancement subsystem 214 and the howling signal from the linear filter 212 may be multiplied by multiplier 215 and the multiplied signal is received by the gain control subsystem 216. The gain control subsystem 216 determines the howling suppression gain signal based on a magnitude level of the received signal. The gain control subsystem 216, for example, may include a dynamic range compression module determines the howling suppression gain signal. The howling suppression gain produced by the gain control subsystem 216 is applied to the ANC feedback loop between the error sensor 206 and the feedback filter 208. For example, as illustrated, the howling suppression system 210 further includes an amplifier 218 that receives the error signal from the error sensor 206 and the gain enhancement signal from the gain control subsystem 216 and produces the amplified error signal that is received by the feedback filter 208.

Figure 3:
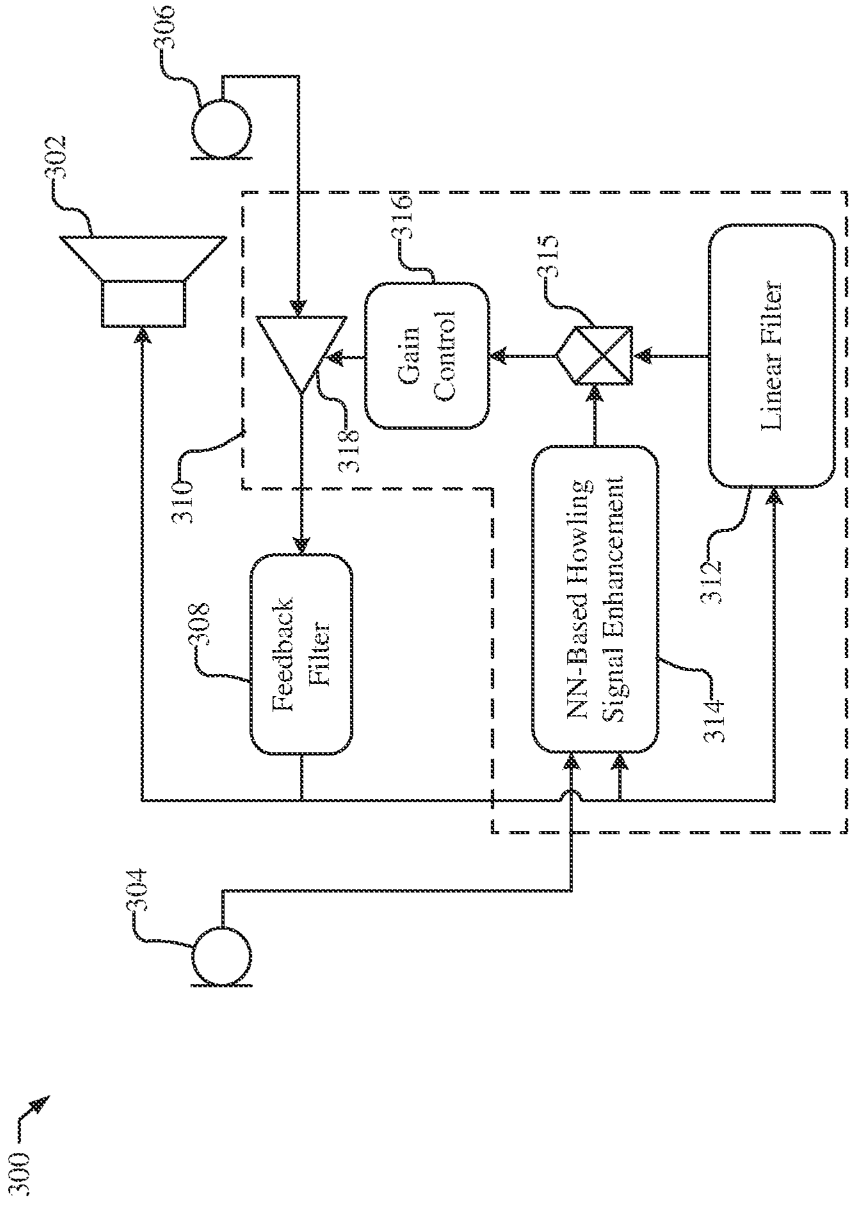
FIG. 3 shows another block diagram of an audio processing system, such as an active noise cancelling system, implementing a howling suppression system.

FIG. 3 illustrates another block diagram of a howling suppression system 310 in an audio processing system, sometimes referred to as ANC system 300, in accordance with one or more implementations. The ANC system 300 is similar to ANC system 200 shown in FIG. 2 and may be an implementation of the ANC system 100 shown in FIG. 1, and the howling suppression system 310 may be an implementation of the howling suppression component 124 shown in FIG. 1. As illustrated ANC system 300 includes, among other components, a speaker 302, a reference sensor 304 that receives external noise and generates a reference signal in response, an error sensor 306 that receives sound from the speaker 302 and any external noise, e.g., that passes through the housing of the listening device, and generates an error signal in response, a feedback filter 308 that receives an amplified error signal and provides a feedback signal to the speaker 302 in response, and the howling suppression system 310 that provides suppression or cancellation of tonal howling in the ANC system 300. The reference sensor 304 is placed at a position where it can receive external noises but is isolated from the speaker 302, so that the reference signal does not include (or includes only a small amount of) sound from the speaker 302.

The howling suppression system 310 includes a linear filter 312 that extracts a howling signal based on the error signal from the error sensor 306. The linear filter 312 may be similar to linear filter 212 shown in FIG. 2, but as illustrated, instead of receiving the error signal from the error sensor 306, the linear filter 312 receives the feedback signal, which is generated based on the error signal from the error sensor 306, from the feedback filter 308. The linear filter 312, for example, may be configured to extract the howling signals from the feedback signal using a linear operation, such as bandpass filtering. The bandpass filtering, for example, may be configured to pass a frequency of the howling signal. For example, if the frequency of the howling signal in the ANC system 300 is 2000 Hz, then the passband of the linear filter 312 may be chosen as 1500 Hz to 2500 Hz. The linear filter 312, for example, may be implemented as an $8^{th}$-order infinite impulse response (IIR) bandpass filter.

The howling suppression system 310 further includes a howling signal enhancement subsystem 314 that is configured to generate a gain enhancement signal to emphasize howling signals and to deemphasize non-howling signals. The howling suppression system 310 may be similar to howling signal enhancement subsystem 214 discussed in FIG. 2, but as illustrated, instead of receiving the error signal from the error sensor 306, the linear filter 312 receives the feedback signal, which is generated based on the error signal from the error sensor 306, from the feedback filter 308. The howling signal enhancement subsystem 314 may be a neural network that can be single-layer or multi-layer. The use of a neural network for the howling signal enhancement subsystem 314 is advantageous as the input features based on the error signal and reference signal may be combined easily. Because the reference sensor 304 is isolated from the speaker 302 such that the reference signal does not include sound from the speaker 302, the howling signal enhancement subsystem 314 may differentiate howling signals produced by the speaker 302 and the non-howling signals. The howling signal enhancement subsystem 314, for example, may be configured to generate the gain enhancement signal based on a power ratio, e.g., log power ratio, between a filtered reference signal from the reference sensor 304 and a filtered error signal from the error sensor 306 and the feedback filter 308. For example, the power ratio between the filtered reference signal and the filtered error signal may be based on an amplitude of the filtered error signal or based on a log amplitude slope deviation of the filtered error signal. In some implementations, the howling signal enhancement subsystem 314 may be further configured additionally or alternatively to generate the gain enhancement signal based on a power ratio, e.g., log power ratio, between two filtered error signals from the error sensor 306 and the feedback filter 308 that is filtered with different passbands. For example, the power ratio between the two filtered error signals may be based on amplitudes of the filtered error signals or based on log amplitude slope deviations of the filtered error signals.

Figure 4:
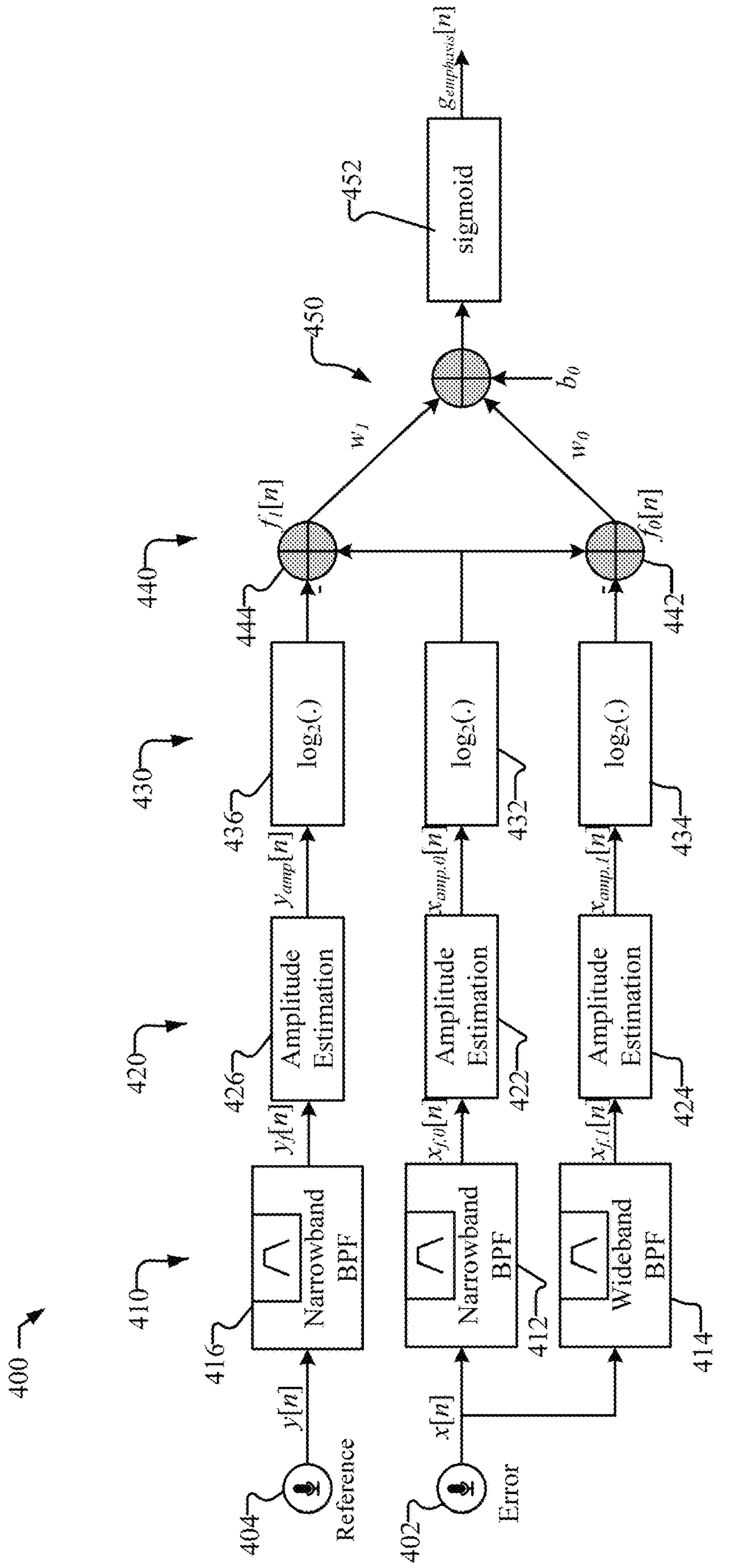
FIG. 4 shows a block diagram of an implementation of a howling signal enhancement system.

FIG. 4, by way of example, illustrates a block diagram of an implementation of a howling signal enhancement subsystem 400, which may be used as the howling signal enhancement subsystem 214 in FIG. 2 or the howling signal enhancement subsystem 314 in FIG. 3.

The howling signal enhancement subsystem 400 determines one or more howling signal input features that are used to generate the gain enhancement signal. The howling signal input features may be determined using only the error signal from the error sensor 402 (e.g., which may be error sensor 206 as shown in FIG. 2 or may be a combination of the error sensor 306, amplifier 318 and the feedback filter 308 as shown in FIG. 3) or may be determined using a combination of the error signal from the error sensor 402 and the reference signal from the reference sensor 404 (e.g., which may be reference sensor 204 shown in FIG. 2 or the reference sensor 304 shown in FIG. 3). The howling signal feature, for example, may be detected based on spectral peakedness. Spectral peakedness is based on the fact that howling signals are narrow band tonal signals. As illustrated, howling signal features may be determined in howling signal enhancement subsystem 400 using filtering 410, amplitude estimation 420, power determination 430, and ratio determination 440.

For example, using only the error signal from the error sensor 402, spectral peakedness, denoted as $f_0$, may be determined based on a power ratio between two passbands of the error signal (x[n]). As illustrated, filtering 410 of the error signal x[n] from error sensor 402 uses two bandpass filters, e.g., narrow band bandpass filter 412 and wide band bandpass filter 414, as follows.

$$x_{f,0}[n]=x[n]*bpf_0[n]$$

$$x_{f,1}[n]=x[n]*bpf_1[n] \quad \text{Eq. (1)}$$

In equation 1, "*" denotes a linear convolution, and $bpf_0[n]$ is the impulse response of the narrow band bandpass filter 412 with a passband of $[f_{low,0}, f_{high,0}]$, such that $f_{low,0}<f_{howling}<f_{high,0}$, where $f_{howling}$ is the frequency of the howling signal, and $bpf_1[n]$ is the impulse response of the wide band bandpass filter 414 whose passband is $[f_{low,1}, f_{high,1}]$, such that $f_{low,1}<f_{howling}<f_{high,1}$. The relationship of the two passbands of bandpass filters 412 and 414 is $f_{low,1}\leq f_{low,0}$ and $f_{high,1}\geq f_{high,0}$.

Amplitude estimation 420 may be performed may be performed using amplitude estimation modules 422 and 424 to determine an exponential moving average on the absolute value of $x_{f,0}[n]$ and $x_{f,1}[n]$ from bandpass filters 412 and 414, respectively, to generate the estimation of amplitudes as follows.

$$x_{amp,0}[n]=\alpha_{amp}x_{amp,0}[n-1]+(1-\alpha_{amp})|x_{f,0}[n]|$$

$$x_{amp,1}[n]=\alpha_{amp}x_{amp,1}[n-1]+(1-\alpha_{amp})|x_{f,1}[n]| \quad \text{Eq. (2)}$$

In equation 2, |.| is the absolute value operation and $\alpha_{amp}$ is a smoothing factor with $\alpha_{amp}<1$.

Power determination 430 places the estimation of amplitudes $x_{amp,0}[n]$ and $x_{amp,1}[n]$ in logarithmic domain using power modules 432 and 434. The spectral peakedness $f_0[n]$ is obtained at the ratio determination 440 based on the ratio of the estimation of amplitudes $x_{amp,0}[n]$ and $x_{amp,1}[n]$ in logarithmic domain at summing node 442 as follows.

$$f_0[n]=\log_2 x x_{amp,0}[n]-\log_2 x_{amp,1}[n] \quad \text{Eq. (3)}$$

In addition or in the alternative to determining the howling signal feature based on only the error signal from the error sensor 402 (spectral peakedness $f_0$), a howling signal feature may be determined using a combination of the error signal from the error sensor 402 and the reference signal from the reference sensor 404, e.g., as a power ratio between the reference signal from the reference sensor 404 and the error signal from the error sensor 402, denoted as spectral peakedness $f_1$. The spectral peakedness $f_1$ may be used as the howling signal feature based on the fact that the error signal power will increase rapidly compared to the reference signal power when howling occurs. The use of spectral peakedness $f_1$ may be particularly useful to distinguish environment tonal noises from howling.

As illustrated, to determine spectral peakedness $f_1$ filtering 410 of the reference signal y[n] from the reference sensor 404 uses a narrow band bandpass filter 416 as follows.

$$y_f[n]=y[n]*bpf_2[n] \quad \text{Eq. (4)}$$

In equation 4, the impulse response $bpf_2[n]$ of the bandpass filter 416 may be the same as the impulse response $bpf_0[n]$ of the bandpass filter 412.

Amplitude estimation 420 may be performed using amplitude estimation module 426 to determine an exponential moving average on the absolute value of y f [n] from bandpass filter 416 to generate the estimation of amplitudes as follows.

$$y_{amp}[n]=\alpha_{amp}y_{amp}[n]+(1-\alpha_{amp})|y_f[n]| \quad \text{Eq. (5)}$$

Power determination 430 places the estimation of amplitude $y_{amp}[n]$ in logarithmic domain using power module 436. The spectral peakedness $f_1$ is obtained at the ratio determination 440 based on the ratio of the estimation of amplitudes $x_{amp,0}[n]$ and $y_{amp}[n]$ in logarithmic domain at summing node 444 as follows.

$$f_1[n]=\log_2 x_{amp,0}[n]-\log_2 y_{amp}[n] \quad \text{Eq. (6)}$$

Using spectral peakedness $f_0$ and $f_1$ as input features in this implementation, the gain enhancement signal $g_{emphasis}[n]$ may be determined using a single layer neural network 450 using a sigmoid function 452 as follows.

$$g_{emphasis}[n]=\mathrm{sigmoid}(w_0f_0[n]+w_1f_1[n]+b_0) \quad \text{Eq. (7)}$$

In equation 7, $w_0$, $w_1$, $b_0$ are the weights and bias of the neural network 450, and the sigmoid function 452 is sigmoid $(n)=1/(1+e^n)$. The weights and bias $w_0$, $w_1$, $b_0$ may be determined such that the gain enhancement signal $g_{emphasis}[n]$ approaches to 1 when there is howling and approaches 0 when there is no howling. While FIG. 4 illustrates particular implementation with two input features and a single layer neural network 450, there is no limitation to the number of howling signal input features and number of layers.

In one implementation, the input, denoted as x'[n], to the gain control subsystem 216 shown in FIG. 2 or the gain control subsystem 316 shown in FIG. 3, may be generated based on the gain enhancement signal $g_{emphasis}[n]$ and the filtered error signal x[n] from linear filter 212, which may have the same impulse response by $f_0[n]$ as the bandpass filter 412 (and bandpass filter 416), as follows.

$$x'[n]=g_{emphasis}[n](x[n]*bpf_0[n]) \quad \text{Eq. (8)}$$

In one implementation, to calculate the howling suppression gain signal g[n] for the ANC feedback loop from the input x'[n], a dynamic range compression (DRC) may be used.

The signal level of input x'[n] may be calculated in a frame fashion as follows.

$$x_L[k]=\max_{m=0\ldots N_F-1}|x'[N_Fk-m]| \quad \text{Eq. (9)}$$

In equation 9, N F is the frame size and k is the frame index.

Nonlinear mapping may then be performed to determine the target gain $g_{target}[k]$ at frame k as follows.

$$g_{target}[k]=10^{(ydB[k]-xdB[k])/20} \quad \text{Eq. (10)}$$

In equation 10, the values of $x_{dB}[k]$ and $y_{dB}[k]$ may be determined as follows.

$$x_{dB}[k]=20\log_{10}x_L[k] \quad \text{Eq. (11)}$$

-continued $$y_{dB}[k]=\begin{cases} thrd+\mathrm{slope}\,(x_{dB}[k]-thrd), & \text{if } x_{dB}[k]>thrd \\ x_{dB}[k], & \text{otherwise} \end{cases}$$

In equation 11, threshold thrd and the slope are DRC parameters that may be predetermined.

Exponential smoothing may be applied to reduce any discontinuity in the howling suppression gain signal g as follows.

$$g[n]=\begin{cases} \alpha_{release}g[n-1]+(1-\alpha_{release})g_{target}\left[\left\lfloor\frac{n}{N_F}\right\rfloor\right], & \text{if } g[n-1]>g_{target}\left[\left\lfloor\frac{n}{N_F}\right\rfloor\right] \\ \alpha_{attack}g[n-1]+(1-\alpha_{attack})g_{target}\left[\left\lfloor\frac{n}{N_F}\right\rfloor\right], & \text{otherwise} \end{cases} \quad \text{Eq. (12)}$$

In equation 12, $\alpha_{release}$ and $\alpha_{attack}$ are smoothing parameters, with $\alpha_{release}<1$ and $\alpha_{attack}<1$, and with a attack smaller than $\alpha_{release}$ to achieve a small attack time for suppressing howling.

Figure 5:
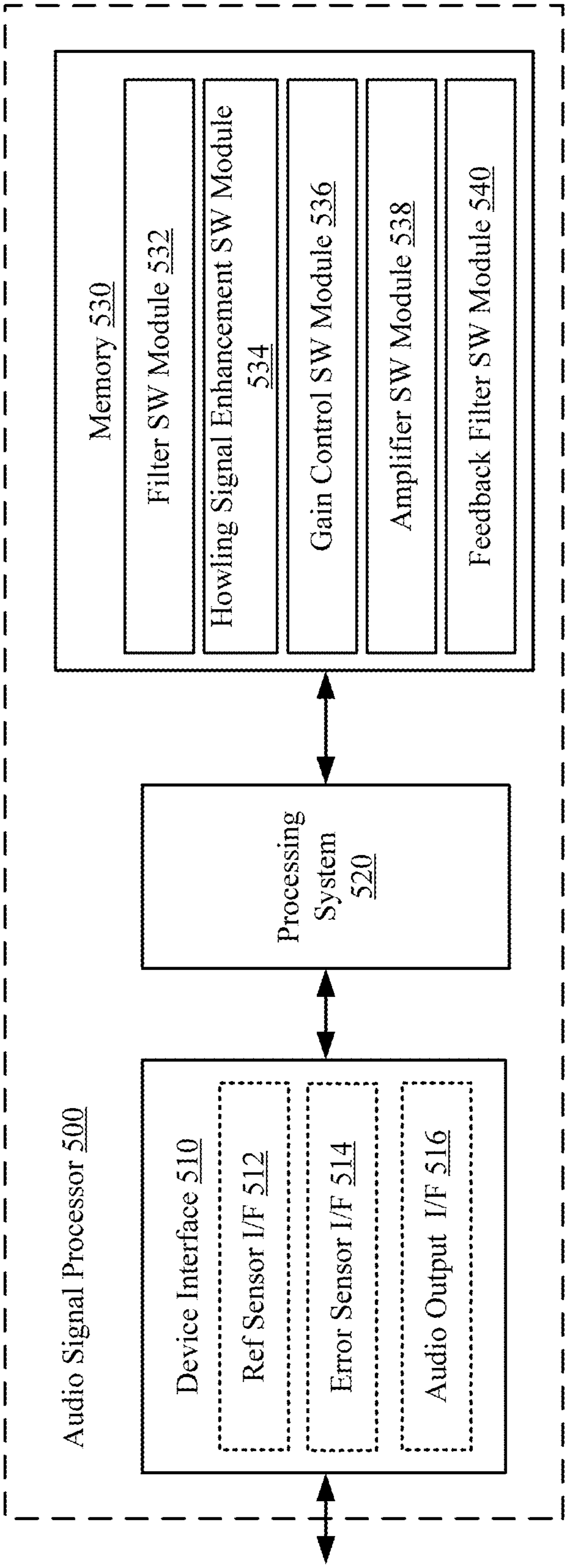
FIG. 5 illustrates a block diagram of an example of an audio signal processor device configured for howling suppression.

FIG. 5 illustrates a block diagram of an example of an audio signal processor device 500 configured for ANC and howling suppression, according to some implementations. More specifically, the audio signal processor device 500 may be configured to emphasize howling signals and deemphasizes non-howling signals in the feedback system, as discussed herein. In some implementations, the audio signal processor device 500 may be one example a processor used in the ANC system 100, ANC system 200, ANC system 300 illustrated in FIGS. 1, 2, and 3, respectively. The audio signal processor device 500, or a portion of the audio signal processor device may be a controller for suppressing howling in the feedback system for an ANC system. The audio signal processor device 500 is illustrated as including a device interface 510, a processing system 520, and a memory 530. It should be understood that additional components may be included in the audio signal processor device 500.

The device interface 510 is configured to communicate with one or more components of an audio processing system, such as an ANC system. In some implementations, the device interface 510 may include a reference sensor interface (I/F) 512, an error sensor interface (I/F) 514, and an audio output interface 516. The reference sensor interface 512 may communicate with one or more reference sensors, such as microphones or other audio sensors, of the audio processing system, such as reference sensors 140, 204, or 304 in FIG. 1, 2, or 3, respectively. For example, in some implementations, the reference sensor interface 512 may receive audio signals from the reference sensors after the audio signal is passed through an ADC, such as ADC 142 shown in FIG. 1, while in other implementations, the reference sensor interface 512 may include the ADC.

The error sensor interface 514 may communicate with one or more error sensors, such as microphones or other audio sensors, of the audio processing system, such as error sensors 162, 206, or 306 in FIG. 1, 2, or 3, respectively. For example, in some implementations, the error sensor interface 514 may receive audio signals from the error sensors after the audio signal is passed through an ADC, such as ADC 164 shown in FIG. 1, while in other implementations, the error sensor interface 514 may include the ADC.

The audio output interface 516 may communicate with one or more loudspeakers of the audio processing system, such as speakers 150, 202, or 302 in FIG. 1, 2, or 3, respectively. The audio output interface 516 may provide an audio signal, such as an anti-noise signal in which howling has been suppressed, to the loudspeaker. For example, in some implementations, the audio output interface 516 may provide the audio signal to the speaker via a DAC, such as DAC 130 shown in FIG. 1, while in other implementations, the audio output interface 516 may include the DAC.

The processing system 520 may include any suitable one or more processors capable of executing scripts or instructions of one or more software programs stored in the audio signal processor device 500 (such as in memory 530). The processing system 520 may be implemented using a combination of hardware, firmware, and software. In some embodiments, the processing system 520 may represent one or more circuits configurable to perform at least a portion of a data signal computing procedure or process related to the operation of audio signal processor device 500.

The memory 530 may include a non-transitory computer-readable medium (including one or more nonvolatile memory elements, such as EPROM, EEPROM, Flash memory, or a hard drive, among other examples) that may store one or more of software (SW) modules that contain executable code or software instructions that when executed by the processing system 520 cause the one or more processors in the processing system 520 to operate as a special purpose computer programmed to perform the techniques disclosed herein. While the components or modules are illustrated as software in memory 530 that is executable by the one or more processors in the processing system 520, it should be understood that the components or modules may be stored in memory 530 or may be dedicated hardware either in the one or more processors of the processing system 520 or off the processors. It should be appreciated that the organization of the contents of the memory 530 as shown in audio signal processor device 500 is merely exemplary, and as such the functionality of the modules and/or data structures may be combined, separated, and/or be structured in different ways depending upon the implementation of the audio signal processor device 500.

The memory 530 may include a filter SW module 532 that when implemented by the processing system 520 configures one or more processors to filter one or more signals, as discussed herein. For example, when implemented, the processing system 520 may be configured to linearly filter the error signal from an error sensor or a feedback signal produced by a feedback filter based on the error signal from the error sensor to extract a howling signal, e.g., as performed by linear filters 212 and 312 of FIGS. 2 and 3. Additionally, when implemented, the processing system 520 may be configured to filter the error signal from an error sensor or a feedback signal, produced by a feedback filter based on the error signal from the error sensor, e.g., as performed by bandpass filters 412 and 414 of FIG. 4, and may be configured to filter the reference signal from a reference sensor, e.g., as performed by bandpass filter 416 of FIG. 4.

The memory 530 may include a howling signal enhancement SW module 534 that when implemented by the processing system 520 configures one or more processors to generate a gain enhancement signal that emphasizes howling signals and deemphasizes non-howling signals, as discussed herein, such as with respect to howling suppression systems 210, 310 shown in FIGS. 2 and 3, and in reference to FIG. 4. The processing system 520, for example, may be configured to generate input features based on the error signal filtered with different passbands, or based on the error signal and the reference signal and the error signal, or based on both the error signal filtered with different passbands and the error signal and the reference signal. The processing system 520, for example, may be configured to generate input features, for example, as power ratios, e.g., log power ratios, between two filtered error signals with different passbands, or power rations, e.g., log power ratios, between a filtered reference signal and a filtered error signal, or both. The processing system 520 may be configured to operate as a single-layer or multi-layer neural network using the input features to generate the gain enhancement signal, for example, as discussed in FIG. 4.

The memory 530 may include a gain control SW module 536 that when implemented by the processing system 520 configures one or more processors to generate a howling suppression gain signal based on a gain enhancement signal and howling signal, which is used to control an amplifier to produce an amplified error signal with suppressed howling. The processing system 520, for example, may be configured to generate an input signal by multiplying the gain enhancement signal and howling signal and to determine the howling suppression gain signal based on a magnitude level of the input signal. The processing system 520 may be configured to generate the howling suppression gain signal using dynamic range compression.

The memory 530 may include an amplifier SW module 538 that when implemented by the processing system 520 configures one or more processors to control amplification of the error signal from the error sensor based on the howling suppression gain signal to produce an amplified error signal with suppressed howling.

The memory 530 may include a feedback filter SW module 540 that when implemented by the processing system 520 configures one or more processors to generate a feedback signal that is provided to the speaker, via audio output interface 516, based on the amplified error signal.

Each software module includes instructions that, when executed by the one or more processors of the processing system 520, cause the audio signal processor device 500 to perform the corresponding functions. The non-transitory computer-readable medium of memory 530 thus includes instructions for performing all or a portion of the operations described below with respect to FIG. 6.

Figure 6:
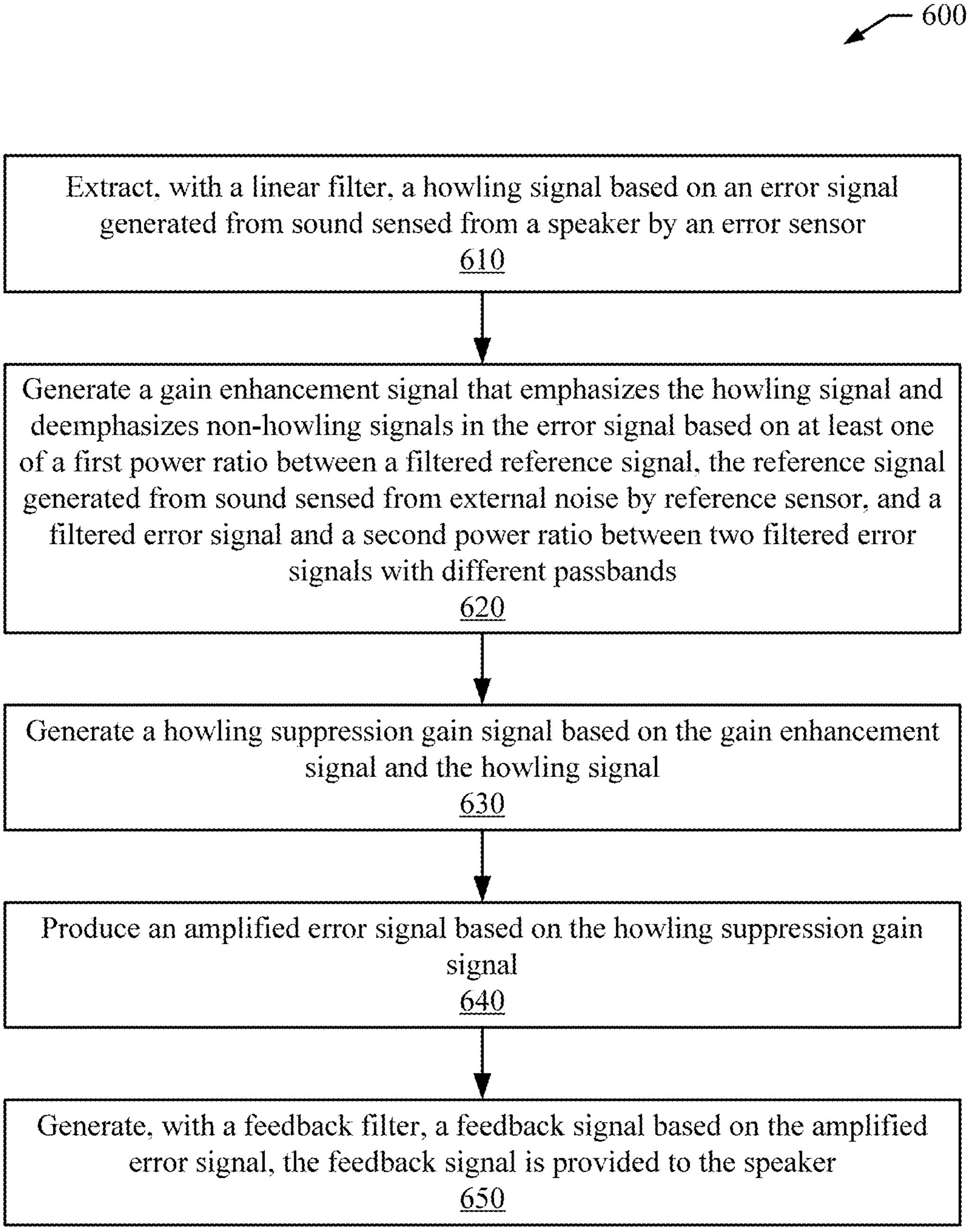
FIG. 6 shows an illustrative flowchart depicting an example operation for audio processing, such as active noise cancellation, for howling suppression.

FIG. 6 shows an illustrative flowchart depicting an example operation 600 for audio processing, such as active noise cancellation, for howling suppression, according to implementations described herein. In some implementation, the example operation 600 may be performed by an audio processing system, such as ANC system 100, ANC system 200, ANC system 300 illustrated in FIGS. 1, 2, and 3, respectively, and howling signal enhancement subsystem 400 illustrated in FIG. 4.

As illustrated, the audio processing system may extract, with a linear filter, a howling signal based on an error signal generated from sound sensed from a speaker by an error sensor (610), e.g., as discussed in reference to linear filters 212 and 312 in FIGS. 2 and 3, respectively. For example, the linear filter may be a bandpass filter configured to pass a frequency of the howling signal, e.g., as discussed in reference to linear filters 212 and 312 in FIGS. 2 and 3, respectively.

The audio processing system may generate a gain enhancement signal that emphasizes the howling signal and deemphasizes non-howling signals in the error signal based on at least one of a first power ratio between a filtered reference signal, the filtered reference signal generated from sound sensed from external noise by reference sensor, and a filtered error signal and a second power ratio between two filtered error signals with different passbands (620), e.g., as discussed in reference to howling signal enhancement subsystems 214, 314, and 400 in FIGS. 2, 3, and 4, respectively. In some implementations, the audio processing system generates the gain enhancement signal using a single layer or multi-layer neural network, e.g., as discussed in reference to howling signal enhancement subsystems 214, 314, and 400 in FIGS. 2, 3, and 4, respectively.

The audio processing system may generate a howling suppression gain signal based on the gain enhancement signal and the howling signal (630), e.g., as discussed in reference to gain control subsystems 216 and 316 in FIGS. 2 and 3, respectively. In some implementations, the audio processing system generates the howling suppression gain signal uses an input signal that includes the howling signal multiplied by the gain enhancement signal, e.g., as discussed in reference to gain control subsystems 216 and 316 and multipliers 215 and 315 in FIGS. 2 and 3, respectively. For example, in some implementations, the audio processing system generates the howling suppression gain signal based on a magnitude level of the input signal, e.g., as discussed in reference to gain control subsystems 216 and 316 in FIGS. 2 and 3, respectively.

The audio processing system may produce an amplified error signal based on the howling suppression gain signal (640), e.g., as discussed in reference to amplifier 218 and 318 in FIGS. 2 and 3, respectively.

The audio processing system may generate, with a feedback filter, a feedback signal based on the amplified error signal, the feedback signal is provided to the speaker (650), e.g., as discussed in reference to feedback filter 122, 208 and 308 in FIGS. 1, 2 and 3, respectively.

In some implementations, the audio processing system extracts, with the linear filter, the howling signal by linearly filtering the error signal received from the error sensor, and generates the gain enhancement signal based on the at least one of the first power ratio between the filtered reference signal and the filtered error signal and the second power ratio between the two filtered error signals with different passbands using the error signal received from the error sensor, e.g., as discussed in reference to linear filter 212 and howling signal enhancement subsystem 214 in FIG. 2 and howling signal enhancement subsystem 400 in FIG. 4.

In some implementations, the audio processing system extracts, with the linear filter, the howling signal by linearly filtering the feedback signal received from the feedback filter, and generates the gain enhancement signal based on the at least one of the first power ratio between the filtered reference signal and the filtered error signal and the second power ratio between the two filtered error signals with different passbands using the feedback signal received from the feedback filter, e.g., as discussed in reference to linear filter 312 and howling signal enhancement subsystem 314 in FIG. 3 and howling signal enhancement subsystem 400 in FIG. 4.

In some implementations, the audio processing system generates the gain enhancement signal based on at least one of the first power ratio between the filtered reference signal and the filtered error signal and the second power ratio between two filtered error signals with different passbands by one of: generating the filtered error signal with a first bandpass filter and generating a second filtered error signal with a second bandpass filter, wherein the second bandpass filter is wider band than the first bandpass filter; or generating the filtered error signal with the first bandpass filter and generating the filtered reference signal with a third bandpass filter; or generating the filtered error signal with the first bandpass filter, generating the second filtered error signal with the second bandpass filter, wherein the second bandpass filter is wider band than the first bandpass filter, and generating the filtered reference signal with the third bandpass filter, e.g., as discussed in reference to howling signal enhancement subsystems 214 and 314 in FIGS. 2 and 3, and bandpass filters 412, 414, and 416 in FIG. 4.

In some implementations, the at least one of the first power ratio is based on amplitudes of the filtered reference signal and the filtered error signal and the second power ratio is based on amplitudes of the two filtered error signals, e.g., as discussed in reference to howling signal enhancement subsystems 214, 314, and 400 in FIGS. 2, 3, and 4, respectively, and in particular to amplitude estimation modules 422, 424, and 426 and power modules 432, 434, and 436 of FIG. 4.

In some implementations, the at least one of the first power ratio is based on a log amplitude slope deviation of the filtered reference signal and the filtered error signal and the second power ratio is based on the log amplitude slope deviation of the two filtered error signals, e.g., as discussed in reference to howling signal enhancement subsystems 214, 314, and 400 in FIGS. 2, 3, and 4.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An audio processing system comprising:

a speaker;

a reference sensor configured to generate a reference signal from external noise;

an error sensor configured to generate an error signal from sound sensed from the speaker;

at least one memory; and a processing system comprising one or more processors coupled to the at least one memory, the processing system configured to:

extract, with a linear filter, a howling signal based on the error signal;

generate a gain enhancement signal that emphasizes the howling signal and deemphasizes non-howling signals in the error signal based on at least one of a first power ratio between a filtered reference signal and a filtered error signal and a second power ratio between two filtered error signals with different passbands;

generate a howling suppression gain signal based on the gain enhancement signal and the howling signal;

produce an amplified error signal based on the howling suppression gain signal; and generate, with a feedback filter, a feedback signal based on the amplified error signal, the feedback signal is provided to the speaker.

2. The audio processing system of claim 1, wherein the audio processing system comprises an active noise cancellation system.

3. The audio processing system of claim 1, wherein the processing system is configured to extract, with the linear filter, the howling signal from the error signal received from the error sensor and the processing system is configured to generate the gain enhancement signal based on the at least one of the first power ratio between the filtered reference signal and the filtered error signal and the second power ratio between the two filtered error signals with the different passbands using the error signal received from the error sensor.

4. The audio processing system of claim 1, wherein the processing system is configured to extract, with the linear filter, the howling signal based on the error signal by being configured to linearly filter the feedback signal received from the feedback filter, and the processing system is configured to generate the gain enhancement signal based on the at least one of the first power ratio between the filtered reference signal and the filtered error signal and the second power ratio between the two filtered error signals with the different passbands using the feedback signal received from the feedback filter.

5. The audio processing system of claim 1, wherein the linear filter comprises a bandpass filter configured to pass a frequency of the howling signal.

6. The audio processing system of claim 1, wherein the processing system is configured to:

generate the filtered error signal with a first bandpass filter and generates a second filtered error signal with a second bandpass filter, wherein the second bandpass filter is wider band than the first bandpass filter; or generate the filtered error signal with the first bandpass filter and generate the filtered reference signal with a third bandpass filter; or generate the filtered error signal with the first bandpass filter, generate the second filtered error signal with the second bandpass filter, wherein the second bandpass filter is wider band than the first bandpass filter, and generate the filtered reference signal with the third bandpass filter.

7. The audio processing system of claim 1, wherein the at least one of the first power ratio is based on amplitudes of the filtered reference signal and the filtered error signal and the second power ratio is based on amplitudes of the two filtered error signals.

8. The audio processing system of claim 1, wherein the at least one of the first power ratio is based on a log amplitude slope deviation of the filtered reference signal and the filtered error signal and the second power ratio is based on the log amplitude slope deviation of the two filtered error signals.

9. The audio processing system of claim 1, wherein the processing system is configured to generate the gain enhancement signal using a single layer or multi-layer neural network.

10. The audio processing system of claim 1, wherein the processing system is configured to generate the howling suppression gain signal based on an input signal comprising the howling signal multiplied by the gain enhancement signal.

11. The audio processing system of claim 10, wherein the processing system is configured to generate the howling suppression gain signal based on a magnitude level of the input signal.

12. A method for audio processing for howling suppression comprising:

extracting, with a linear filter, a howling signal based on an error signal generated from sound sensed from a speaker by an error sensor;

generating a gain enhancement signal that emphasizes the howling signal and deemphasizes non-howling signals in the error signal based on at least one of a first power ratio between a filtered reference signal, the filtered reference signal generated from sound sensed from external noise by a reference sensor, and a filtered error signal and a second power ratio between two filtered error signals with different passbands;

generating a howling suppression gain signal based on the gain enhancement signal and the howling signal;

producing an amplified error signal based on the howling suppression gain signal; and generating, with a feedback filter, a feedback signal based on the amplified error signal, the feedback signal is provided to the speaker.

13. The method of claim 12, the audio processing comprises active noise cancellation.

14. The method of claim 12, wherein extracting, with the linear filter, the howling signal comprises linearly filtering the error signal received from the error sensor, and generating the gain enhancement signal based on the at least one of the first power ratio between the filtered reference signal and the filtered error signal and the second power ratio between the two filtered error signals with the different passbands uses the error signal received from the error sensor.

15. The method of claim 12, wherein extracting, with the linear filter, the howling signal comprises linearly filtering the feedback signal received from the feedback filter, and generating the gain enhancement signal based on the at least one of the first power ratio between the filtered reference signal and the filtered error signal and the second power ratio between the two filtered error signals with the different passbands uses the feedback signal received from the feedback filter.

16. The method of claim 12, wherein the linear filter comprises a bandpass filter configured to pass a frequency of the howling signal.

17. The method of claim 12, wherein generating the gain enhancement signal based on at least one of the first power ratio between the filtered reference signal and the filtered error signal and the second power ratio between the two filtered error signals with the different passbands comprises one of:

generating the filtered error signal with a first bandpass filter and generating a second filtered error signal with a second bandpass filter, wherein the second bandpass filter is wider band than the first bandpass filter; or generating the filtered error signal with the first bandpass filter and generating the filtered reference signal with a third bandpass filter; or generating the filtered error signal with the first bandpass filter, generating the second filtered error signal with the second bandpass filter, wherein the second bandpass filter is wider band than the first bandpass filter, and generating the filtered reference signal with the third bandpass filter.

18. The method of claim 12, wherein the at least one of the first power ratio is based on amplitudes of the filtered reference signal and the filtered error signal and the second power ratio is based on amplitudes of the two filtered error signals.

19. The method of claim 12, wherein the at least one of the first power ratio is based on a log amplitude slope deviation of the filtered reference signal and the filtered error signal and the second power ratio is based on the log amplitude slope deviation of the two filtered error signals.

20. The method of claim 12, wherein generating the gain enhancement signal uses a single layer or multi-layer neural network.

21. The method of claim 12, wherein generating the howling suppression gain signal uses an input signal comprising the howling signal multiplied by the gain enhancement signal.

22. The method of claim 21, wherein generating the howling suppression gain signal is based on a magnitude level of the input signal.

23. An audio processing system comprising:

a speaker;

a reference sensor configured to generate a reference signal from external noise;

an error sensor configured to generate an error signal from sound sensed from the speaker;

a feedback filter that provides a feedback signal to the speaker based on an amplified error signal; and a howling suppression system comprising:

a linear filter configured to extract a howling signal based on the error signal;

a howling signal enhancement subsystem configured to generate a gain enhancement signal that emphasizes the howling signal and deemphasizes non-howling signals in the error signal based on at least one of a first power ratio between a filtered reference signal and a filtered error signal and a second power ratio between two filtered error signals with different passbands;

a gain control subsystem configured generate a howling suppression gain signal based on the gain enhancement signal and the howling signal; and an amplifier configured to receive the error signal and to produce the amplified error signal based on the howling suppression gain signal.

* * * * *